June 1, 1954 L. L. ARBUCKLE 2,680,007
ROTATING HEAT EXCHANGER
Filed Dec. 4, 1948 4 Sheets-Sheet 1
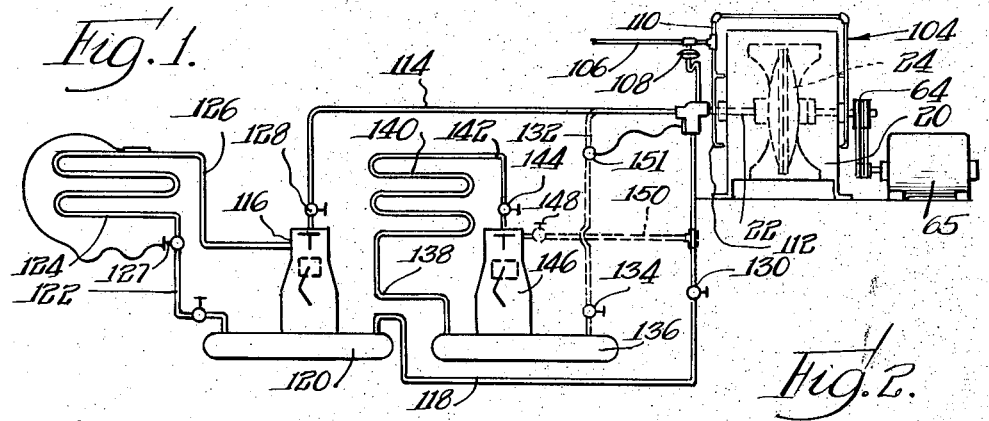
INVENTOR.
Lawrence L. Arbuckle
By Moore, Olson & Trexler
Attys.

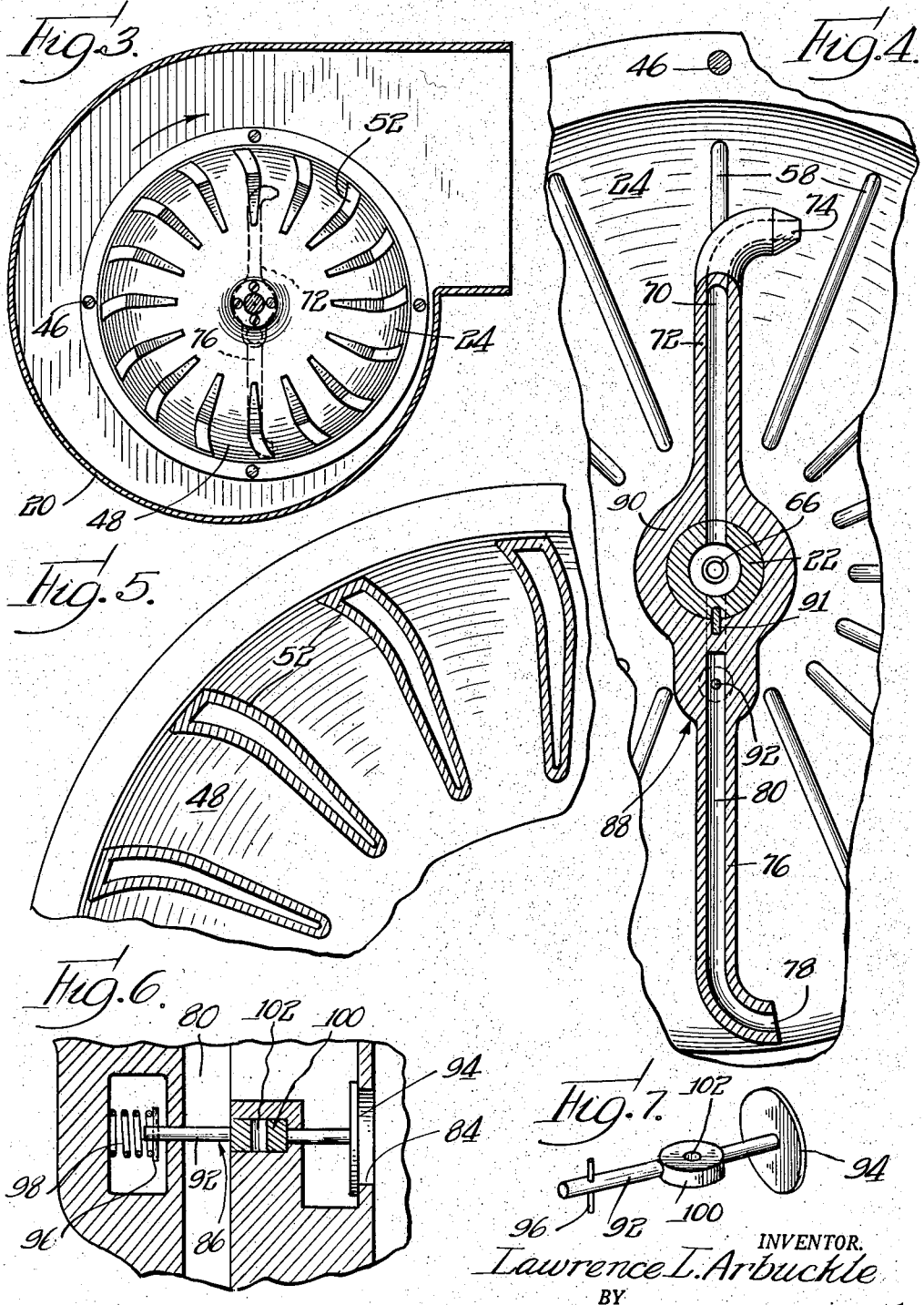

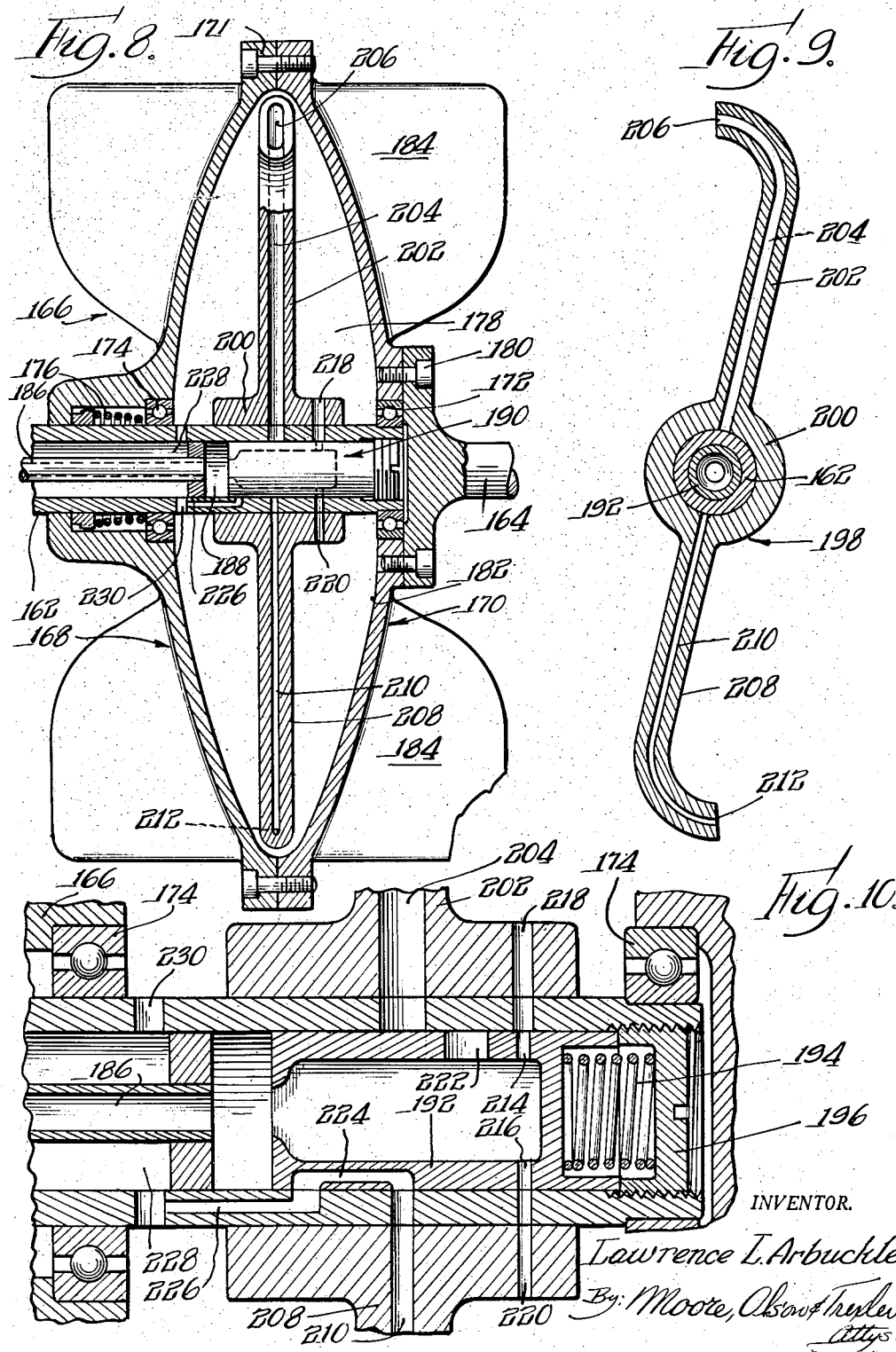

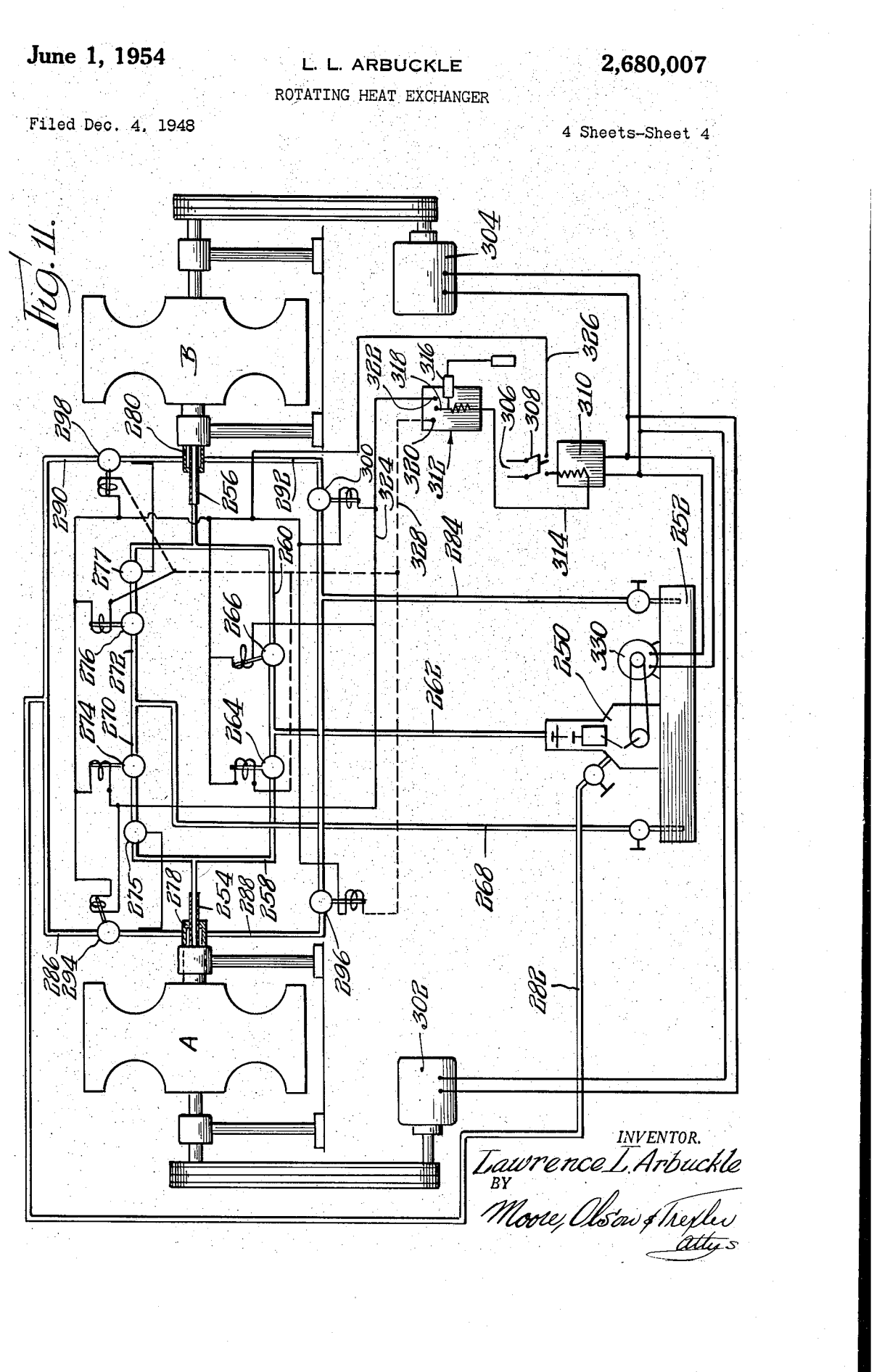

Patented June 1, 1954

2,680,007

UNITED STATES PATENT OFFICE 2,680,007

ROTATING HEAT EXCHANGER

Lawrence L. Arbuckle, Chicago, Ill.

Application December 4, 1948, Serial No. 63,561

3 Claims. (Cl. 257—2)

This invention relates to heat exchangers and more particularly to rotatable heat exchangers which may be used either as condensers or evaporators.

An object of this invention is to provide a rotatable heat exchanger which has a high rate of heat exchange per unit surface area.

Another object of this invention is to provide a rotatable heat exchanger which has a high rate of heat exchange per unit surface area and which moves a surrounding medium at a static pressure while warming or cooling this medium.

Yet another object of this invention is to provide a rotating heat exchanger in which means are provided to give high turbulence of both the heating or cooling medium and the medium to be heated or cooled.

A further object of this invention is to provide a rotating heat exchanger which utilizes the velocity pressure of the fluid being heated or cooled to rotate the moving parts of the heat exchanger.

Still another object of the present invention is to provide a rotating heat exchanger in which lubricating oil from the compressor crank case entrained in the heat transfer medium is returned from the heat exchanger to the compressor crank case when the heat exchanger is used as an evaporator.

Yet another object of the present invention is to provide a rotating heat exchanger whose operation may be changed from that of a condenser to an evaporator without interrupting operation of the heat exchanger.

A still further object of this invention is to provide a rotating heat exchanger which is equipped with means for automatically and quickly increasing the heat transfer capacity in case of momentary overloads.

A still further object of the present invention is to provide a heat exchanger whose capacity when used as a condenser or an evaporator is variable over a wide range.

Yet another object of the present invention is to provide a system comprising a rotatable heat exchanger of the present invention, a compressor and a refrigerant receiver for said compressor, a condenser and an evaporator connected in such a manner that the rotatable heat exchanger can be operated alternately as an evaporator or as a condenser.

A still further object of the present invention is to provide a system comprising two rotatable heat exchangers of the present invention, a compressor and a refrigerant receiver for the compressor, and an automatic valve and valve switching arrangement connecting these parts to allow operation of the first heat exchanger as an evaporator and the second heat exchanger as a condenser and reversing the operation of the heat exchangers in response to the change in condition surrounding the heat exchangers.

It has been found that these objects are accomplished by the device shown in the accompanying drawings in which:

Figure 1 is a schematic view showing an embodiment of the present invention connected so as to be operated as a condenser or an evaporator;

Figure 2 is a partial front elevational view in cross section of one embodiment of the present invention;

Figure 3 is a side view of the embodiment of the invention shown in Figure 2 mounted in a conventional fan housing;

Figure 4 is a partial cross sectional view of an embodiment of the invention shown in Figure 2 when viewed in the direction of the arrows 4—4 of Figure 2;

Figure 5 is a partial cross sectional view as seen along the line 5—5 of Figure 2;

Figure 6 is an enlarged view of the automatic valve which is responsive to the difference in pressure between the material in the outlet passage to cause the outlet passage to be increased in size at a predetermined pressure difference;

Figure 7 is a perspective view of the valve stem member shown in Figure 6;

Figure 8 is a cross sectional view of another embodiment of the present invention;

Figure 9 is a side view partially in cross section of the pick-up arms and associated valve parts of the embodiment of the invention shown in Figure 8;

Figure 10 is an enlarged cross sectional view of the automatic valve shown in Figure 8 for changing the operation of the device from that of a condenser to an evaporator; and Figure 11 shows two of the heat exchangers as shown in Figure 2 connected to a compressor and a receiver in a refrigeration cycle and connected with automatic valves and valve controls.

The invention comprises a support member 20 which supports a stationary shaft 22 upon which is rotatably mounted a heat exchanger shell 24. In the embodiment shown in Figures 2 and 3, the support member 20 is a standard fan housing. This fan housing 20 has laterally extending flange portions 26 and 28 in which are mounted bearing blocks 30 and 32 respectively. Stationary shaft 22 is supported by bearing block 30 and is prevented from rotation therein by set screws 34. The heat exchanger shell 24 is rotatably mounted on the stationary shaft 22 in such a manner as to allow the rotation of the shell 24 with respect to and about the stationary shaft 22. In the embodiment shown in Figure 2 the shell 24 is supported on roller bearings 36 and 38 whose races are set in appropriate recesses in the stationary shaft 22. The races of the roller bearings 36 and 38 are held in position on the shaft 22 by nuts 35 and 37 which are threaded on the stationary shaft 22. The heat exchanger shell 24 has shoulders 39 and 40 which engage the races of the roller bearings 36 and 38 in such a manner that the bearings receive a large portion of the lateral pressure exerted by the fluid under pressure within the shell. This structure will tend to prevent binding that might otherwise occur and acts to center the shell properly. A housing 41 is attached as by bolts 43 to the shell 24 and encloses the shaft seal structure 45 which is placed at the junction of the inlet to the heat exchanger shell 24 and stationary tube 2. The shaft seal structure 45 allows rotation of the shell 24 about the stationary axis 22 while a fluid under pressure is present within the shell 24 without leakage of this high pressure fluid through the bearing joint.

The heat exchanger shell 24 is composed of two separate circular half shells 42 and 44 which are joined at their periphery in any suitable manner such as by bolts 46. The circular configuration of the half shells 42 and 44 is best seen in Figure 3 which shows a side view of one of these shells. As seen in Figure 2 the half shells have a main body structure 48 and 50 from which extend lateral fins 52 and 54. These lateral fins 52 and 54 extend radially from the center of rotation of the heat exchanger shell 24 and are curved at their outer ends in a direction opposite to the direction of rotation of the heat exchanger shell 24. The radial configuration of the fins is best seen in Figures 3 and 5 which also illustrate that there is a plurality of these fins on both sides of the heat exchanger shell. As best seen in Figures 2 and 5 these fins are all hollow in construction which gives a very great heat transfer surface and allows communication with the main central chamber 56 of the heat exchanger shell 24. Inside the main body structure 48 and 50 extending laterally therefrom and radially with respect to the axis of rotation are inner turbo blades 58. The general shape and arrangement of these inner turbo blades 58 is best seen in Figure 4. The exact function and purpose of these turbo blades 58 will be explained later.

A rotatable driving shaft 60 is attached in a suitable manner such as by bolts 62 to the heat exchanger shell 24. This shaft is rotatably supported in bearing block 32 and carries on one end a pulley or other suitable driving means 64. (See Figure 1.) It is seen therefore that as driving shaft 60 is turned the rotatable heat exchanger shell 24 will be rotated upon its bearings 36 and 38.

The material which is to be heated or cooled is introduced into the heat exchanger shell 24 through an inlet passage 66 within the stationary shaft 22. The inlet passage 66 discharges into an inner chamber 68 also formed in the stationary shaft 22 which in turn connects with a duct 70 formed within inlet tube 72. Inlet tube 72 discharges through nozzles 74 into the inner chamber 56 of the heat exchanger shell 24. The fluid which has been heated or cooled is returned through one or both of a pair of alternate paths. One of these return paths is through dip tube 76 which has an inlet port 78 (best seen in Figure 4) which connects with passage 80 formed within the dip tube 76. This passage 80 in turn connects with an annular passage 82 in the stationary shaft 22 which forms the discharge conduit for the heat exchanger. The other return path is through a port 84, past valve 86 and thence to the annular passage 82.

As seen in Figures 2 and 4 the inlet tube 72 and the dip tube 76, valve 86 and their associated passages are formed as a separate entity which structure is designated by the numeral 88. This structure 88 is made with a hub portion 90 in which is a passage adapted to fit over the stationary shaft 22. Structure 88 is held stationary with respect to shaft 22 by means of a key 91. It is seen therefore that the dip tube 76 and the inlet tube 74 and their associated parts are stationary throughout operation of the heat exchanger.

The valve 86 which has been mentioned above is located in the hub portion 90 of the structure 88. As best seen in Figures 6 and 7, this valve consists of a valve stem 92 at one end of which is attached valve head 94 and at the other end of which is attached a bar 96. A spring 98, one end of which is attached to the hub portion 90 and the other end of which presses against bar 96 always tends to urge the valve stem in such a direction that valve head 94 closes port 84. Valve stem 92 also carries an auxiliary closure member 100 in which is formed a port 102. When pressure against valve head 94 positions the valve stem away from port 84, this auxiliary closure member 100 will be positioned in the passage 80 in dip tube 76 and will greatly restrict the area available for the passage of liquid therethrough.

A water spray system 104 (see Figures 1 and 2) is provided to automatically spray the heat exchanger shell 24 in case the device is overloaded while acting as a condenser or gas cooler. The system 104 is connected through line 106 to a source of water not shown. An automatically controlled valve 108 in line 106 is attached to the outlet passage 82 in the stationary shaft 22 and is responsive to the head pressure in this discharge passage 82. Whenever the pressure in passage 82 is such as to indicate that the heat exchanger is overloaded, valve 108 automatically opens and allows water to flow into the distributor pipe 110. Attached to distributor pipe 110 at appropriate points is a plurality of spray nozzles 112 which are positioned to advantageously spray the cooling fins 52 and 54 of the heat exchanger shell 24. The mist of water surrounding the cooling fins 52 and 54 will tend to be evaporated by absorbing heat through the walls of the fins from the liquid within the heat exchanger shell 24.

In order to explain the operation of the rotating heat exchanger it must be connected to the proper auxiliary parts. When the heat exchanger is to be used as a condenser, the inlet passage 66 of the heat exchanger is connected to the discharge line 114 of compressor 116 (see Figure 1) and outlet passage 82 is connected to a return line 118 which empties into a liquid receiver 120. Liquid receiver 120 is connected through line 122 to evaporator 124 which in turn is connected through line 126 to the suction side of the compressor 116. A thermostatic expansion valve 127 is provided to regulate the amount of refrigerant admitted to the evaporator to insure that all the liquid refrigerant is vaporized and that no liquid is fed to the compressor. It will be seen that this gives a complete refrigeration system.

In a typical cycle a suitable refrigerating fluid for example Freon, ammonia, carbon dioxide, or sulfur dioxide is supplied as a gas under pressure at a temperature above that surrounding the cooling fins 52 and 54 from compressor 116 through line 114 to the inlet passage 66 of the heat exchanger. The gas still under pressure leaves inlet passage 66, enters inner chamber 68 then goes through duct 70 in inlet tube 72 and is discharged through the nozzles 74 which are directed towards the inner turbo blades 58. This discharge of the gas under pressure against the turbo blades 58 will tend to rotate the heat exchanger shell 24 in a direction which is clockwise as viewed in Figure 3, in which case the upper fins in Figure 2 will be moving out of the plane of the drawing and the lower fins will be moving into the plane of the drawing. The gas under pressure will diffuse outwardly and into the hollow fins 52 and 54. Movement of the fins 52 and 54 through the surrounding air will tend to cool these fins and in turn cool the gas under pressure within the fins. Since the cooling action will be more effective the faster the heat exchanger shell 24 is rotated through the cooling medium surrounding it, an additional force of rotation is imparted to the shell by a driving means 65 attached to the pulley 64. (See Figure 1.)

As the gas under pressure is cooled by the rotation of the fins 52 and 54 through the cooling medium, this gas will tend to condense. When it condenses it will be thrown to the periphery of the heat exchanger shell 24 due to its greater density and will be held there by centrifugal force. This liquid, it will be seen, is impinged upon the port 78 in the dip tube 76 since the liquid refrigerant in the shell 24 will be moving at the same velocity as the shell 24 and since the dip tube 76 is stationary with respect to the shell 24. The velocity of the liquid refrigerant will tend to force it through port 78 and up into the passage 80 in the dip tube 76. The fluid will then pass from passage 80 into the outlet passage 82 and from there through line 118 to the liquid receiver 120.

The cycle is completed when the liquid is taken from receiver 120 through line 122 to the evaporator 124 where it absorbs heat and is converted to a gas and then taken through line 126 to to the suction port of the compressor 116. The compressor 116 will again compress the gas to a high pressure simultaneously heating it and will expel it from the discharge port into discharge line 114 and thence begin the cycle again.

It will be noted that whenever the heat exchanger is used as a condenser that the valve 86 is in the closed position as shown in Figure 2, thus giving only one return path from the heat exchanger to the outlet passage 82.

If the heat exchanger is overloaded for some reason and the gas within the shell 24 is not being condensed properly, the automatic valve 108 will open the water supply line 106 and supply a fine spray of water through nozzles 112 in the area surrounding the cooling fins 52 and 54. When the spray of water hits the cooling fins, the water will absorb the heat transferred through the wall of the fins 52 and 54 from the refrigerating gas within, and the water will thereby be vaporized. Since a pound of water absorbs a large amount of heat when it is changed from a liquid into a gas at room temperature, the spray system affords a very effective means of reducing the overload on the heat exchanger.

The condensing capacity of the heat exchanger is increased as the rate of rotation is increased. An increase in the rate of rotation moves a greater quantity of air past the cooling fins per unit time, and also reduces the film thickness of the stagnant layer of air surrounding the film and thus increases the heat transfer coefficient. It is apparent therefore that this particular heat exchanger can be adapted to assume a variable condensing load. It should also be remembered that a substantial portion of the kinetic velocity of the incoming gas under pressure is utilized in rotating the heat exchanger and thus effects an economy in operating power. Of course, the number and design of the cooling fins 52 and 54 can be altered to achieve the optimum operation characteristics.

When the heat exchanger is to be used as an evaporator, the valves 128 and 130 in lines 114 and 118 respectively are closed. The inlet passage 66 of the heat exchanger is connected through line 132 and valve 134 to a liquid receiver 136. The liquid receiver 136 is connected through line 138 to a condenser 140 which is connected through line 142 and valve 144 to a compressor 146. The suction port of the compressor 146 is connected through valve 148 and line 150 to the outlet passage 82 of the heat exchanger. A thermostatic expansion valve 151 is provided at the inlet to the shell 24 in line 132 for the reasons given above.

In a typical evaporator cycle, liquid under pressure is forced from liquid receiver 136 through line 132 to the inlet passage 66 of the heat exchanger. This liquid under pressure is then forced through inner chamber 68 and duct 70 through the ports 74 in the inlet tube 72 and impinged against the inner turbo blades 58 of the heat exchanger shell 24. As in the condensing cycle the shell 24 is ordinarily rotated by a driving means attached to pulley 64 and by the impact of the incoming fluid from nozzle 74 impinging upon the inner turbo blades 58. The direction of rotation in the evaporating cycle is the same as that of the condensing cycle and is clockwise as viewed in Figure 3. Centrifugal force will throw the evaporating liquid refrigerant to the periphery of the heat exchanger shell 24 and into the fins 52 and 54. The heating medium surrounding the outside of the fins 52 and 54 will be cooled and thus heat the liquid within the fins and convert it into a gas.

The gas being of a lesser density than the liquid will tend to collect around the axis of rotation of the shell 24 and in particular will tend to collect in port 84 of the valve structure 86. As seen in Figure 1, taken in cooperation with Figure 2, the outlet passage 82 is connected through line 150 to the suction port of the compressor 146. Under the usual operating conditions the suction pressure of the compressor 146 will be much less than the pressure of the liquid introduced through nozzles 74 into the main chamber 56 of the heat exchanger shell 24. It will be seen therefore that this difference in pressure between the chamber 56 and the outlet passage 82 will produce a force against valve head 94 and will overcome the tension of spring 98, thus opening port 84 and placing the auxiliary closure member 100 in the passage 80 of the dip tube 76. The movement of valve head 94 away from port 84 opens a passage from port 84 to the outlet passage 82 and then back to the suction side of the compressor 146.

Any liquid which is not vaporized will be thrown to the periphery of the shell 24 and will tend to be forced through port 78 and up the dip tube 76. Since the auxiliary closure member 100 has been moved to a position which blocks passage 80 the only exit from passage 80 will be through the small port 102. Ordinarily all of the liquid refrigerant would evaporate before it is scooped up by the dip tube. As is well known in the art, however, a certain amount of lubricating oil from the crank case of the compressor is usually entrained with the liquid refrigerant. This lubricating oil will not evaporate under the conditions existing in the shell 24 and therefore will be returned through the dip tube 76 and outlet passage 82 back to the compressor 146. It is important that this oil be returned to the compressor for any holdup of lubricant within the heat exchanger shell 24 might so delete the lubricating supply of the compressor that serious damage would be done thereto.

The vaporized refrigerant which is returned through port 84 and outlet passage 82 to compressor 146 is again compressed by the compressor and then sent through line 142 to a condenser 140. From the condenser 140 the condensed refrigerant is returned to the liquid reservoir 136 through the line 138 to complete the refrigeration cycle.

Just as in the condensing cycle the capacity of the heat exchanger can be varied by changing the rate of rotation of the heat exchanger shell 24. Again, the higher the rate of rotation the greater the capacity.

A comparison of the use of the heat exchanger as a condenser and as an evaporator will show that this rotatable heat exchanger can be alternately a condenser or an evaporator without changing any of the structure or controls thereof. The heat exchanger operates equally well as a condenser or an evaporator while being rotated in the same direction and a change from operation as a condenser to that of an evaporator and back again is accomplished automatically by means of the valve structure 86. In certain installations, this ability to be either an evaporator or a condenser without stopping the operation of the heat exchanger and without any alteration in the structure is most important. Of course, it is necessary to make the proper connections to the other components of the refrigerating or heating circuit as will be seen from Figure 1 and the above description.

Although only one inlet tube and one dip tube have been shown for purposes of illustration, it will be apparent to those skilled in the art that a plurality of these components could be used in a rotating heat exchanger. It also should be kept in mind that the force imparted to the inlet tube 72 by virtue of the incoming fluid reacting thereon is approximately counteracted by a force acting on the dip tube 76 when fluid which has been thrown to the periphery of the shell 24 is impinged thereon. Since these forces are acting in such a direction with respect to the combined axis of the dip tube 76 and the inlet tube 72 as to cancel each other, there is a minimum of rotating torque force applied to the structure 88 and thus produces at most a small turning torque in the stationary shaft 22.

Although a refrigerant which changes state has been used for purposes of illustration, a fluid which does not change state could also be used with the rotating heat exchanger. When the heat exchanger is operating as a condenser, the heating medium within the shell 24 will give up heat to the fluid surrounding the outside of the fins 52 and 54. It is seen therefore that in this type of operation the heat exchanger will tend to heat the surrounding medium which might be air, water or any other suitable fluid. When the heat exchanger is being operated as an evaporator the fluid within the shell 24 will absorb heat and this heat will be absorbed from the medium surrounding the outside of the fins 52 and 54, thus cooling this surrounding medium.

The motion of the shell 24 through the surrounding medium will impart to that medium a motion which may be utilized for transporting that medium to a suitable point of application. It will be seen also that the particular design of the fins 52 and 54 and their rapid rotation through the surrounding medium will always tend to clean the outer surface of these fins and thus continually maintain a high heat transfer coefficient.

Figures 8, 9 and 10 illustrate another embodiment of this invention. The embodiment shown in Figures 8–10 has a housing and bearing structure for stationary shaft 162 and rotatable shaft 164 which is similar to that shown in Figures 2–7. The heat exchanger shell 166 is also made in two sections 168 and 170 which are joined at the periphery in a suitable manner such as by means of bolts 171 as was the shell for the preceding embodiment. The heat exchanger shell 166 is rotatably mounted on the stationary shaft 162 in a suitable manner such as by ball bearings 172 and 174 which are held in appropriate recesses in the stationary shaft 162. A shaft seal 176 effectively prevents escape of fluids under pressure from the interior 178 of the shell 166. The driving shaft 164 is suitably attached as by screws 180 to the shell section 170 and carries on its other end a suitable driving means not shown. It is seen therefore that when shaft 164 is rotated the shell 166 will be rotated about the stationary shaft 162. The shell 166 has a main body portion 182 from which extend lateral hollow fins 184. These fins 184 extend laterally from the center of rotation and are curved near the periphery of the shell in a direction opposite to the direction of rotation.

The material to be evaporated or condensed is brought to the interior 178 of the shell 166 by means of inlet passage 186 which is mounted within the stationary shaft 162. The inlet passage 186 discharges into chamber 188 in which is positioned valve structure 190. The valve structure 190 comprises a valve head 192 in which are located several passages which will be explained later. A spring 194 which normally urges the valve head 192 towards the inlet passage 186 is backed up by plug 196 which is threadedly connected to and effectively seals the end of stationary shaft 162.

Also mounted on stationary shaft 162 is the dip tube assembly 198 shown in Figure 9. The dip tube assembly 198 has a hub portion 200 which fits over and is non-rotatably secured to the stationary shaft 162. Extending radially from this hub portion 200 is a dip tube 202 in which is a passage 204 which terminates in a port 206, and an oil return tube 208 in which is a passage 210 that terminates in an opening 212.

When the heat exchanger is operated as an evaporator, liquid refrigerant is introduced through inlet passage 186 to chamber 188. The pressure of this liquid forces valve head 192 away from the inlet passage 186 in such a manner as to align passages 214 and 216 in the valve head 192 with passages 218 and 220 respectively in the stationary shaft 162 and the hub portion 200 of the dip tube structure. Movement of the valve head 192 in the direction indicated above closes passage 204 in the dip tube 202 by displacing port 222 in the valve head 192 away from passage 204. At the same time passage 224 in the valve head 192 connects passage 210 in the oil return tube 208 through passage 226 in stationary shaft 162 to the annular outlet passage 228 which is also positioned in the stationary shaft 162.

When passages 214 and 216 are in line with passages 218 and 220 respectively, the liquid to be evaporated is expelled through these passages to the interior 178 of the heat exchanger shell 166. As in the first embodiment described above, the shell 166 is rotated by suitably driving shaft 164. Shell 166 is rotated in a direction such that the fins 184 at the top of Figure 8 will move into the plane of the drawing and the fins 184 at the bottom of the drawing will move out of the plane of the drawing. The centrifugal force generated by rotating shell 166 will tend to force the liquid towards the periphery of the shell 166 and into the hollow fins 184. The liquid to be evaporated will absorb heat from the medium surrounding the outside of the fins and will thereby be evaporated. The gas which has evaporated having a lesser density than the liquid will tend to be forced towards the axis of rotation and will be forced through ports 230 in the stationary shaft 162 and from there into the outlet passage 228. The movement of gas into passage 228 is further facilitated by the fact that passage 228 is connected to the suction port of a compressor and the pressure at this suction port is much less than the pressure of the liquid being introduced through inlet passage 186.

Any lubricating oil which is carried into the heat exchanger in the liquid refrigerant will not evaporate under these conditions and will therefore be thrown towards the periphery of the shell 166. This oil will be impinged upon the opening 212 of the oil return tube 208 and its kinetic energy will force it up passage 210 to the passages 224 and 226 and thence to the return passage 228. As explained above, the return of this lubricating oil to the compressor system is most important to protect the operation of the compressor.

It will be seen therefore that if the refrigerant within the shell is evaporated the heat needed for evaporation will be absorbed from the medium surrounding the outside of the fins 184 and will thereby cool this surrounding medium.

When the heat exchanger is used as a condenser the heated gas under high pressure is introduced through passage 228. It will be seen therefore that there will be no force tending to urge valve head 192 away from passage 186 and that therefore this valve will be placed in such a position by the tension of spring 194 that passages 214 and 216 will not be engaged with passages 218 and 220 and passage 210 will not be connected to passage 228. Instead passage 222 will register with passage 204 in the dip tube 202. The heated gases under pressure in passage 228 will pass through port 230 into the interior 178 of the heat exchanger shell 166. This gas will permeate to the fins 184 and here it will transfer its heat to the medium surrounding the outside of fins 184. As the temperature of the gas is reduced at constant pressure, condensation will occur. The condensed liquid will be thrown to the periphery of the shell 166 by centrifugal force and will be impinged upon port 206 in the dip tube 202. The kinetic energy of the condensed liquid will force it down passage 204 through port 222 and out through passage 186 to a liquid reservoir not shown. Since the gas within the shell 166 must give up heat to condense, the medium surrounding the outside of the shell 166 will be heated.

As explained above, the load or capacity of the heat exchanger when operated either as a condenser or an evaporator can be varied by varying the rate of rotation of the shell 166. The momentary overload water spray system described above in reference to the first embodiment of the invention could also be applied to the second embodiment. The number and arrangement of the dip tube and the oil return tube are optional and this specification is to be understood to include the various modifications of number, arrangement and design of these elements. Likewise the number and specific design of the fins 184 is a matter of choice and this specification is to be construed to cover these modifications.

A comparison of the use of the heat exchanger as an evaporator and a condenser will reveal that the device may be used as either by simply changing the input and outlet connections. The direction of rotation of the heat exchanger shell 166 is the same when the heat exchanger is used as an evaporator or a condenser. The internal valve which switches operation from evaporator to condenser is accomplished automatically.

It is seen that both embodiments of the invention provide a heat exchanger which can be used either as a condenser or an evaporator without modification or complicated changes in a structure. The invention will automatically convert from an evaporator to a condenser and back again according to the condition of the fluids present in inlet and outlet passages. When the primary object is to heat or cool a body of fluid such as air or water, it will be seen that a unit of the invention can accomplish both alternately without even stopping operation of the heat exchanger. The energy of rotation of the shell can also be utilized to move the mass of air or water which has been heated or cooled. This gives a large saving in pumping power consumed. One unit of the invention provides a wide range of ratings or loads both as a condenser and as an evaporator simply by altering the speed or rotation of the heat exchanger shell.

The rapid movement of the shell and fins through the surrounding medium gives a high coefficient of heat transfer because the surface of the fins are continually cleaned and scrubbed by the passage of the medium across them and this action also reduces the stagnant air film associated with these fins which is a resistance to heat transfer.

Figure 11 shows two heat exchangers generally designated A and B which are of the type shown in Figure 2 connected to a compressor 250 and refrigerant reservoir 252 by an appropriate valve system. The inlet passages 254 of heat exchanger A and 256 of heat exchanger B are connected through lines 258 and 260 respectively to discharge line 262 which is the main supply line for compressed gases coming from the compressor 250. Solenoid valves 264 and 266 are positioned in lines 258 and 260 respectively to open and close these lines at the proper time. The solenoid valves 264 and 266 are of the type which are closed when de-energized and are opened upon energizing their coils.

The inlet passages 254 and 256 are also connected to the high pressure liquid supply line 268 which is connected to the reservoir 252 through lines 270 and 272 in which are positioned solenoid control valves 274 and 276 respectively. Thermostatic expansion valves 275 and 277 are also positioned in lines 270 and 272 respectively to control the amount of refrigerant fed to the heat exchangers A and B when they are operating as evaporators. As explained above this is to insure that the evaporators are not overloaded and that all of the liquid introduced into them is vaporized. As is well known in the art, if liquid should be returned to the suction side of the compressor and this liquid introduced into the cylinder, damage might result from the compressor attempting to compress this liquid.

Outlet passages 278 and 280 of heat exchangers A and B respectively are connected to two points, namely, the return line 282 to the compressor 250 and the input line 284 of the reservoir 252. Line 286 connects outlet passage 278 to return line 282, and line 288 connects passage 278 with the input line 284 while line 290 connects the outlet passage 280 with the return line 282 and line 292 connects this output passage 280 with the input line 284. Solenoid control valves 294, 296, 298, and 300 are positioned in lines 286, 288, 290, and 292 respectively. This completes the refrigerant system.

The particular embodiment shown in Figure 11 shows electric motors 302 and 304 driving heat exchangers A and B respectively. It is to be understood that other means may be used to drive the heat exchangers. The electricity to run the motors 302 and 304 comes from a source of supply 306 through line switch 308 and a motor starter device 310. This motor starter 310 is operative only when the proper signal is supplied from the space thermostat 312 through line 314 and when line switch 308 is closed. The space thermostat is of the conventional type and consists of a temperature responsive element 316 and associated parts which move contact arm 318 to make contact with contacts 320 and 322 in a manner which will be described later. Space thermostat 312 also controls the various solenoid valves mentioned above. Contact 322 is permanently connected to conductor 324 and is connected to one side of the electrical supply line 306 through line 314 when contact arm 318 moves against contact 322. Line 326 is permanently attached to the other side of the main electrical supply line 306. It will be seen that the coils of the solenoid control valves 266, 274, 294 and 300 are connected in parallel between lines 324 and 326 and are energized when the contact arm 318 of thermostat 312 moves against contact 322.

Contact 320 is permanently connected to line 328 which is shown dotted in Figure 11; contact 320 is also connected to one side of the main electrical supply line 306 when contact arm 318 moves against contact 320. The coils of solenoid control valves 264, 276, 296 and 298 are connected in parallel between lines 328 and 326. These coils will therefore be energized when contact arm 318 is positioned against contact 320 with switch 308 closed.

Motor 330 which drives compressor 250 is also connected to the motor starter device 310 and is connected in such a manner that the compressor is operated at the same time that the heat exchanger shells are rotated.

In the use of the system shown in Figure 11 heat exchanger B may be placed in a space whose temperature it is desired to control. Heat exchanger A would be placed at a point probably some distance from heat exchanger B and probably would have a medium surrounding it whose temperature was substantially constant.

The temperature responsive element 316 of the thermostat 312 would be placed in the space whose temperature is controlled. The temperature responsive element 316 and contacts 320 and 322 would be so arranged that at some specified minimum temperature, for instance 65°, the contact arm 318 would be positioned against contact 322 and at some desirable maximum temperature such as 85° the contact arm 318 would be positioned against contact 320. All the solenoid control valves are the type which are closed when the coils are deenergized and are open when the coils are energized. If the temperature in the compartment in which the thermostat 312 is placed and which is positioned, heat exchanger B falls to or below 65°, contact arm 318 moves toward and makes contact with contact 322. This will energize the coils of solenoid control valves 266, 274, 294, and 300, thus opening these valves. It will be seen that this connects the inlet passage 256 of heat exchanger B through line 260 and valve 266 to the discharge line 262 of compressor 250. This will supply refrigerant gas under pressure to the input passage 256 of heat exchanger B.

At the same time outlet passage 280 in heat exchanger B will be connected through line 292 and valve 300 to the input line 284 of the refrigerant reservoir 252.

In a similar manner inlet passage 254 in heat exchanger A is connected through valve 274 in line 270 to the liquid supply line 268 of the reservoir 252 and outlet passage 278 is connected through valve 294 in line 286 to the return line 282 of the compressor 250.

With these connections made it is seen that refrigerant gas under pressure is supplied to the inlet passage 256 of the heat exchanger B and the medium surrounding the exterior of the shell of heat exchanger B will cool this compressed gas and condense this gas to a liquid. This liquid will be returned in the manner explained above through the outlet passage 280 to the liquid reservoir 252. The heat exchanger B in this case therefore acts as a heat rejector or condenser and will heat the medium surrounding the heat exchanger shell. Simultaneously heat exchanger A is acting as a heat absorber or an evaporator drawing the liquid supplied from heat exchanger B to the reservoir 252 through the liquid supply line 268 to its inlet passage 254. This liquid under pressure will be evaporated in the heat exchanger shell A by absorbing heat from the medium surrounding the heat exchanger shell of heat exchanger A. The gas formed by the evaporation of the liquid along with the entrained lubricant will be returned through outlet passage 278, lines 286 and 282 to the compressor 250.

This provides a complete refrigeration system in which heat from the medium surrounding heat exchanger A will be transmitted by means of the refrigerant of the system to heat exchanger B where it will be rejected to the medium surrounding heat exchanger B, thus heating this medium and the space in which the medium is contained. This operation continues until the temperature of the medium surrounding the shell 24 is heated sufficiently to move contact arm 318 away from contact 322.

The cycle is reversed as soon as the temperature of the medium surrounding heat exchanger B rises to or above 85° and causes the temperature responsive unit 316 to move contact arm 318 against contact 320. When this happens the solenoids which were energized before remain de-energized and the coils of solenoid control valves 264, 276, 296 and 298 become energized. This connects the inlet passage 256 of heat exchanger B to the liquid supply line 268 of reservoir 252. The outlet passage 280 of heat exchanger B through valve 298 to the return line 282 of the compressor 250. The outlet passage 278 of the heat exchanger A through valve 296 to the input line 284 of the reservoir 252 and the outlet passage 254 of heat exchanger A of valve 264 to the discharge line 262 of the compressor 250.

These connections will cause heat exchanger A to operate as a condenser by supplying refrigerant gas under pressure to the inlet passage. This gas under pressure will be condensed in the heat exchanger A and will thereby give up heat to the medium surrounding heat exchanger A. The condensed refrigerant will be returned through the outlet passage 278 and input line 284 to the liquid reservoir 252. This liquid refrigerant which has given up part of its energy will be drawn through liquid supply line 268 and deliver it through line 272 to the input passage 256 of heat exchanger B. In heat exchanger B this liquid will be evaporated, absorbing heat from the medium surrounding heat exchanger B, thus cooling this medium. The gas plus lubricant will be returned through the outlet passage 280 to return line 282 and thence to the suction side of compressor 250. It is seen that this action will cool the medium surrounding heat exchanger B until the temperature is such that contact arm 318 is moved away from contact 320, at which time the motors 302 and 304 driving the heat exchanger shells, the motor 330 driving the compressor and the various solenoid valves will be de-energized.

It is apparent from the above description that the temperature of the medium surrounding heat exchanger B can be controlled within new desirable limits using only one heat exchanger positioned in this medium. It will also be noted that the control of the temperature of this surrounding medium is fully automatic and is accomplished by means of a relatively simple solenoid valve and space thermostat arrangement.

Although a heat transfer medium which changes state has been used to illustrate the operation of the device shown in Figure 11, it is to be understood that a heat transfer medium which does not change state could be used. In such an arrangement the compressor 250 would be replaced by a pumping means. The operation of heat exchangers A and B as heat rejecters and heat absorbers, however, would remain the same.

Two embodiments of the invention have been shown by way of illustration, but it is to be understood that the specification is intended to cover the modifications described above and all other modifications which are apparent to those skilled in the art.

I claim:
1. A heat exchanger comprising a shaft, a heat exchanger shell rotatably mounted upon said shaft, said shell having hollow fins, the interior of said fins communicating with the interior of said shell, means for rotating said shell on said shaft, an inlet passage in said shaft, means positioned in the interior of said rotating shell and connected to said inlet passage to direct the incoming fluid against the inner walls of said shell, an outlet passage in said shaft, a collecting means connected to said outlet passage and extending to the periphery of said shell, and automatic valve means positioned between said shell and said outlet passage and responsive to the difference in pressure between the material in said shell and the material in said outlet passage to cause said outlet passage to be increased in size at a predetermined pressure difference.

2. A heat exchanger comprising a shaft, a heat exchanger shell rotatably mounted upon said shaft, said shell having hollow fins, the interior of said fins communicating with the interior of said shell, inner turbo blades formed on the interior of said shell, an inlet passage for said shell, inlet means positioned on said shaft in the interior of said rotating shell and connected to said inlet passage, said inlet tube means being positioned to direct incoming fluid against said inner turbo blades to cause rotation of said shell, an outlet passage for said shell, a collecting means extending from said shaft to the periphery of said shell, said collecting means being positioned to collect liquid at the periphery of said shell and to direct said liquid to said outlet passage, and automatic valve means positioned between said shell and said outlet passage and responsive to the difference in pressure between the material in said shell and the material in said outlet passage to cause said outlet passage to be increased in size at a predetermined pressure difference.

3. A heat exchanger comprising a shaft, a heat exchanger shell rotatably mounted upon said shaft, means for rotating said shell on said shaft, an inlet passage for said shell, an outlet passage for said shell, a collecting means extending to the periphery of said shell and connecting with said outlet passage, an alternate passage connecting the interior of said shell and said outlet passage, automatic valve means positioned in said alternate passage, said valve means being responsive to the pressure difference between said shell and said outlet passage to open said alternate passage and to restrict the passage in said collecting means at a predetermined pressure difference and to close said alternate passage and remove the restriction from said collecting means when the pressure difference is below the predetermined value.

References Cited in the file of this patent

UNITED STATES PATENTS

| Number | Name | Date |
|---|---|---|
| 672,011 | Ramstedt | Apr. 16, 1901 |
| 1,559,883 | Karr et al. | Nov. 3, 1925 |
| 1,854,757 | Newhouse | Apr. 19, 1932 |
| 1,866,509 | De Vout et al. | July 5, 1932 |
| 1,925,702 | Nelson | Sept. 5, 1933 |
| 2,056,023 | Stevenson | Sept. 29, 1936 |
| 2,082,682 | Cardenas | June 1, 1937 |
| 2,119,907 | Dunlap | June 7, 1938 |
| 2,286,604 | Crawford | June 16, 1942 |
| 2,303,094 | Sharpe | Nov. 24, 1942 |
| 2,439,871 | Skelley et al. | Apr. 20, 1948 |
| 2,469,316 | Shaw | May 3, 1949 |
| 2,474,304 | Clancy | June 28, 1949 |
| 2,481,149 | Peterson | Sept. 6, 1949 |
| 2,485,525 | Bedale | Oct. 8, 1949 |
| 2,517,498 | McGrath | Aug. 1, 1950 |
| 2,521,371 | Hornbostel et al. | Sept. 5, 1950 |

FOREIGN PATENTS

| Number | Country | Date |
|---|---|---|
| 83,689 | Germany | Nov. 27, 1895 |